United States Patent
Zhang et al.

(10) Patent No.: US 11,337,109 B2
(45) Date of Patent: May 17, 2022

(54) RELATED METHOD FOR MEDIUM ACCESS CONTROL LAYER PACKETIZATION, USER EQUIPMENT, AND BASE STATION

(71) Applicants: SHARP KABUSHIKI KAISHA, Sakai (JP); FG INNOVATION COMPANY LIMITED, Tuen Mun (HK)

(72) Inventors: Chongming Zhang, Shanghai (CN); Renmao Liu, Shanghai (CN)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/637,036

(22) PCT Filed: Aug. 2, 2018

(86) PCT No.: PCT/CN2018/098319
§ 371 (c)(1),
(2) Date: Feb. 6, 2020

(87) PCT Pub. No.: WO2019/029432
PCT Pub. Date: Feb. 14, 2019

(65) Prior Publication Data
US 2020/0245188 A1    Jul. 30, 2020

(30) Foreign Application Priority Data

Aug. 11, 2017   (CN) .......................... 201710689981.9

(51) Int. Cl.
*H04W 28/06*       (2009.01)
*H04W 72/12*       (2009.01)

(52) U.S. Cl.
CPC ......... *H04W 28/06* (2013.01); *H04W 28/065* (2013.01); *H04W 72/1242* (2013.01); *H04W 72/1268* (2013.01)

(58) Field of Classification Search
CPC .......................... H04W 28/06; H04W 72/1242
See application file for complete search history.

(56) References Cited

U.S. PATENT DOCUMENTS 10,314,072 B2 *  6/2019  Loehr .................. H04W 76/14
10,602,495 B2 *  3/2020  Yi ........................ H04W 72/121
(Continued)

FOREIGN PATENT DOCUMENTS

CN          102067479 A       5/2011
WO       2009/154414 A2      12/2009

OTHER PUBLICATIONS

Huawei, Hisilicon, "Configuration of priority order between data and MAC CE", R2-1705566, 3GPP TSG-RAN WG2 #98, Hangzhou, China, May 15-19, 2017.

(Continued)

*Primary Examiner* — Parth Patel
(74) *Attorney, Agent, or Firm* — ScienBiziP, P.C.

(57) ABSTRACT

The present disclosure provides a method performed at UE, comprising: receiving a UL grant from a base station, wherein the UL grant comprises information related to uplink resources allocated to the UE by the base station; obtaining a priority order, configured for the UE by the base station based on at least one of an uplink resource type, an uplink resource scheduling mode, and an uplink resource transmission mode, of a plurality of logical channels to which the uplink resources allocated in the UL grant are applicable; if a BSR carried in a MAC CE does not comprise buffer status information of a logical channel having a highest priority, then setting a priority of the MAC CE carrying the BSR to be lower than a priority of data from the logical channel having the highest priority; and according to the set priority order of the data and the MAC CE, sequentially assembling the data and the MAC CE into a MAC protocol data unit (PDU) for transmission on the allocated (Continued)

uplink resources. The present disclosure further provides corresponding UE, a corresponding base station, and a computer-readable medium.

2 Claims, 4 Drawing Sheets

(56) References Cited

U.S. PATENT DOCUMENTS

| | | | | |
|---|---|---|---|---|
| 2011/0267959 | A1* | 11/2011 | Yi | H04W 28/0278 |
| | | | | 370/241 |
| 2014/0177570 | A1 | 6/2014 | Yi et al. | |
| 2018/0115957 | A1* | 4/2018 | Lin | H04W 52/146 |
| 2019/0053220 | A1* | 2/2019 | Zhang | H04B 7/0417 |
| 2019/0098540 | A1* | 3/2019 | Lee | H04W 76/11 |
| 2019/0174346 | A1* | 6/2019 | Murray | H04W 80/02 |
| 2019/0200249 | A1* | 6/2019 | Yoon | H04L 5/0023 |
| 2019/0239242 | A1* | 8/2019 | Yi | H04W 72/1268 |
| 2020/0022094 | A1* | 1/2020 | You | H04W 72/0413 |
| 2020/0029237 | A1* | 1/2020 | Kim | H04W 68/06 |
| 2020/0037315 | A1* | 1/2020 | Lee | H04W 72/0446 |
| 2020/0196327 | A1* | 6/2020 | Zhang | H04W 72/1242 |
| 2020/0229111 | A1* | 7/2020 | Kim | H04W 74/0833 |
| 2020/0236582 | A1* | 7/2020 | Chin | H04W 72/14 |
| 2020/0236703 | A1* | 7/2020 | Amuru | H04W 74/0808 |
| 2020/0245188 | A1* | 7/2020 | Zhang | H04W 28/065 |
| 2020/0374960 | A1* | 11/2020 | Deenoo | H04W 72/14 |

OTHER PUBLICATIONS

Ericsson, "Prioritization in MAC", Tdoc R2-1707120, 3GPP TSG-RAN WG2 #98-AH, Qingdao, P.R. of China, Jun. 27-29, 2017.
NTT Docomo, "New SID Proposal: Study on New Radio Access Technology", RP-160671, 3GPP TSG RAN Meeting #71 Göteborg, Sweden, Mar. 7-10, 2016.

* cited by examiner

RELATED METHOD FOR MEDIUM ACCESS CONTROL LAYER PACKETIZATION, USER EQUIPMENT, AND BASE STATION

TECHNICAL FIELD

The present disclosure relates to the field of wireless communications technologies. More specifically, the present disclosure relates to a related method for medium access control layer packetization, corresponding user equipment, and a corresponding base station.

BACKGROUND

With the rapid growth of mobile communications and great progress of technology, the world will move toward a fully interconnected network society where anyone or anything can acquire information and share data anytime and anywhere. It is estimated that there will be 50 billion interconnected devices by 2020, of which only about 10 billion may be mobile phones and tablet computers. The rest are not machines communicating with human beings but machines communicating with one another. Therefore, how to design a system to better support the Internet of Everything is a subject needing further and intensive study.

For this purpose, at the 3rd Generation Partnership Project (3GPP) RAN #64 plenary meeting held in March 2016, a research subject on new 5G radio access technology was proposed (see non-patent literature: RP-160671 New SID Proposal: Study on New Radio Access Technology). In the description of the work project, the operating frequency band of future new communication RATs can be expanded to 100 GHz, which will satisfy at least service requirements for enhanced mobile broadband, the demand for communication between massive Internet of Things terminals, service requirements of high reliability requirements, and so on. The research work of the project is expected to end in 2018.

A MAC (medium access control) layer adopts a multiplexing mode, and may assemble data from different logical channels into a MAC PDU (MAC protocol data unit), or may assemble a MAC CE (MAC control element) carrying control information and data into a MAC PDU. When receiving a UL grant (uplink resource grant), UE may perform packetization (namely, form a MAC PDU; the "packet" herein refers to a "MAC PDU") according to the size of uplink resources allocated in the UL grant, and transmit a formed packet on the allocated uplink resources.

In the existing LTE technology, the priority of a MAC CE carrying a BSR (Buffer Status Report, namely, buffer status report, which is different in format from a padding BSR) is higher than the priority of data from any logical channel other than data from an uplink common control channel. As a person skilled in the art knows, the uplink common control channel is a kind of logical channel whose data always has the highest priority higher than any other data or a MAC CE, but the uplink common control channel does not have a logical channel number. As a result, the uplink common control channel is separately described herein, and unless otherwise indicated, logical channels herein all refer to logical channels other than the uplink common control channel. Moreover, the priority of a MAC CE carrying a recommended bit rate query or a padding BSR is lower than that of data from any logical channel.

Therefore, in the process of packetization, if a MAC CE having a higher priority (for example, a MAC CE carrying a BSR) exists, then the MAC CE is put into a packet firstly, then it is investigated in the remaining space of allocated uplink resources whether any data from a logical channel and other MAC CEs having lower priorities (for example, a MAC CE carrying a recommended bit rate query or padding BSR) exist, and the data and MAC CEs are sequentially put into the packet according to the priority order from high to low until the allocated uplink resources are used up.

However, in a 5G system, parameter configurations (numerology) and TTIs (transmission time interval) of physical resources used may be different in the uplink resource allocation process in order to meet service requirements, and when an uplink UL grant arrives, data of a logical channel matching the UL grant may be preferentially transmitted. If the priority of a MAC CE carrying a BSR is always set to be higher than that of data from any logical channel according to the existing LTE technology without considering the specific factor of the logical channel in judging the priorities of a MAC CE and data of a logical channel, then the MAC CE carrying the BSR occupies uplink transmission resources of the data of the logical channel, causing delay to data transmission of the logical channel.

SUMMARY

The present disclosure aims to solve the aforementioned technical problem. Specifically, the present disclosure aims to solve the technical problem of transmission delay of data from a logical channel having a high priority caused by preferential transmission of a MAC CE.

According to a first aspect of the present disclosure, a method performed at user equipment (UE) is provided, comprising: receiving an uplink grant (UL grant) from a base station, wherein the UL grant comprises information related to uplink resources allocated to the UE by the base station; obtaining a priority order, configured for the UE by the base station based on at least one of an uplink resource type, an uplink resource scheduling mode, and an uplink resource transmission mode, of a plurality of logical channels to which the uplink resources allocated in the UL grant are applicable; if a buffer status report (BSR) carried in a medium access control (MAC) control element (CE) does not comprise buffer status information of a logical channel having a highest priority, then setting a priority of the MAC CE carrying the BSR to be lower than a priority of data from the logical channel having the highest priority; and according to the set priority order of the data and the MAC CE, sequentially assembling the data and the MAC CE into a MAC protocol data unit (PDU) for transmission on the allocated uplink resources.

In one exemplary embodiment, the priority order of the plurality of logical channels is pre-configured by the base station through radio resource control (RRC) signaling or dynamically instructed to the UE in downlink control information (DCI) carried in a physical downlink control channel (PDCCH).

In one exemplary embodiment, if the buffer status report (BSR) carried in medium access control (MAC) control element (CE) does not comprise the buffer status information of the logical channel having the highest priority, then priority of the MAC CE carrying the BSR is further set to be higher than a priority of data from the other logical channels other than data from an uplink common control channel.

In one exemplary embodiment, if the buffer status report (BSR) carried in the medium access control (MAC) control element (CE) comprises the buffer status information of the logical channel having the highest priority, then the priority of the MAC CE carrying the BSR is set to be higher than a priority of data from any logical channel other than data from an uplink common control channel.

In one exemplary embodiment, the method further comprises:

if a space of the allocated uplink resources remaining after the data of the logical channel having the highest priority is assembled into the MAC PDU is insufficient to accommodate the MAC CE carrying the BSR, then generating a padding BSR according to the remaining space of the allocated uplink resources and causing the padding BSR to be carried in a MAC CE to be assembled into the MAC PDU, wherein the MAC CE carrying the padding BSR comprises at least buffer status information of a logical channel having a highest priority among the other logical channels.

In one exemplary embodiment, the method further comprises: if a MAC CE carries information related to link interruption recovery, then setting a priority of the MAC CE carrying the information related to link interruption recovery to be higher than the priority of the data from any logical channel other than the data from the uplink common control channel.

In one exemplary embodiment, the method further comprises: if a MAC CE carries information related to a recommended bit rate of a logical channel, then setting a priority of the MAC CE carrying the information related to the recommended bit rate of the logical channel to be lower than the priority of the MAC CE carrying the BSR and the priority of the data from any logical channel other than the data from the uplink common control channel, wherein when recommended bit rate queries of a plurality of logical channels need to be reported to the base station, a plurality of MAC CEs respectively carrying information related to recommended bit rates of the logical channels are generated, and priorities of the plurality of MAC CEs are determined according to priorities of the logical channels carried therein.

According to a second aspect of the present disclosure, UE is provided, comprising:

a communication interface, configured to perform communication;

a processor; and a memory, storing computer-executable instructions, wherein when executed by the processor, the instructions cause the UE to perform the method described in the first aspect of the present disclosure.

According to a third aspect of the present disclosure, a method performed at a base station is provided, comprising: configuring, for user equipment (UE) based on at least one of an uplink resource type, an uplink resource scheduling mode, and an uplink resource transmission mode, a priority order of a plurality of logical channels to which uplink resources allocated in an uplink grant (UL grant) are applicable; and pre-configuring the priority order of the plurality of logical channels for the UE through radio resource control (RRC) signaling, or dynamically instructing the priority order of the plurality of logical channels to the UE in downlink control information (DCI) carried in a physical downlink control channel (PDCCH).

According to a fourth aspect of the present disclosure, a base station is provided, comprising:

a communication interface, configured to perform communication;

a processor; and a memory, storing computer-executable instructions, wherein when executed by the processor, the instructions cause the base station to perform the method described in the third aspect of the present disclosure.

According to a fifth aspect of the present disclosure, a computer-readable medium is provided, having instructions stored thereon, wherein when executed by a processor, the instructions cause the processor to perform the methods described in the first and third aspects of the present disclosure.

According to the technical schemes described in the aforementioned aspects of the present disclosure, in the case in which a BSR carried in a MAC CE does not comprise buffer status information of a logical channel having a highest priority level, a priority of the MAC CE carrying the BSR is set to be lower than a priority level of data from the logical channel having the highest priority, so as to avoid transmission delay of data from a logical channel having a high priority level caused by preferential transmission of a MAC CE, and meet quality of service requirements for data transmission.

BRIEF DESCRIPTION OF THE DRAWINGS

The aforementioned and/or additional aspects and advantages of the present disclosure will become apparent and comprehensible from the following description of exemplary embodiments in connection with the accompanying drawings, in which.

DETAILED DESCRIPTION

Figure 1:
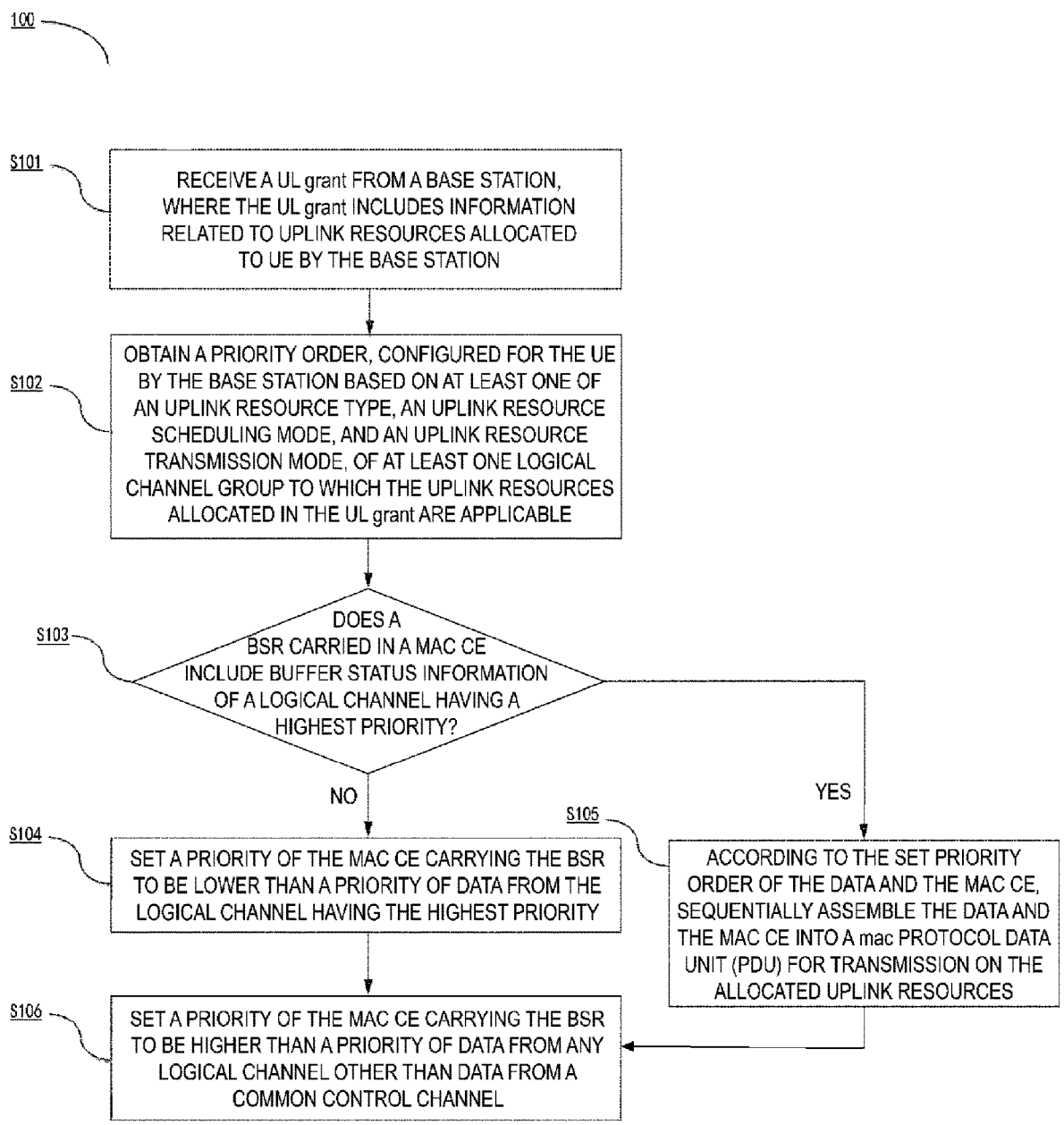
FIG. 1 is a schematic flowchart of a MAC PDU packetization method performed at UE according to an exemplary embodiment of the present disclosure.

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

A plurality of embodiments according to the present disclosure are specifically described below by using an LTE mobile communications system and its subsequent evolved versions as an exemplary application environment. However, it should be noted that the present disclosure is not limited to the following embodiments, but is applicable to more other wireless communications systems, such as a future 5G cellular communications system, and is applicable to other base stations and terminal devices, such as base stations and terminal devices supporting eMTC, MMTC, and so on.

Prior to the specific description, a plurality of terms mentioned in the present disclosure are described as follows. The terms involved in the present disclosure shall have the meanings set forth below, unless otherwise indicated.

UE: User Equipment/user equipment/terminal device

MAC: Medium Access Control/medium access control

RRC: Radio Resource Control/radio resource control

BSR: Buffer Status Report/buffer status report

TTI: Transmission time Inteva Utransmission time interval

A MAC layer adopts a multiplexing mode, and may assemble data from different logical channels into a MAC PDU, or may assemble a MAC CE carrying control information and data into a MAC PDU. When receiving a UL grant, UE may perform packetization (namely, form a MAC PDU) according to the size of uplink resources allocated in the UL grant, and transmit a formed packet on the allocated uplink resources.

A BSR is a mode of reporting buffer status by the UE. A BSR is usually triggered in three cases: the first case is when the UE does not have uplink data to be transmitted, uplink data from any logical channel arrives; the second case is when the UE has uplink data to be transmitted, data arrives and a priority level of a logical channel from which the data comes is higher than that of a logical channel from which the currently transmitted data comes; the third case is periodic BSR reports, where BSR reports are periodically generated under the control of a timer.

BSR reports have two structures: one is a short BSR, where only a buffer status of a single logical channel is reported in this structure, and a logical channel number and a corresponding buffer status are included therein; the other is a long BSR, where the UE reports a buffer status of all logical channels in this structure, and in this form of report, a buffer report at a specific location corresponds to a specific logical channel, and therefore, the Long BSR does not include a logical channel number. The Short BSR is used in the case in which only one logical channel has data to be transmitted, that is, only one logical channel has a buffer being non-zero; the Long BSR is used in the case in which more than one logical channel has data arrived, and for a logical channel not having data arrived, a corresponding buffer report in the Long BSR is zero.

A MAC PDU packetization method performed at UE according to an exemplary embodiment of the present disclosure will be described below with reference to FIG. 1.

FIG. 1 is a schematic flowchart of a MAC PDU packetization method 100 performed at UE according to an exemplary embodiment of the present disclosure. As shown in FIG. 1, the method 100 may include steps S101 to S105.

In step S101, the UP may receive an uplink grant (UL grant) from a base station, where the UL grant includes information related to uplink resources allocated to the UE by the base station.

In step S102, the UE may obtain a priority order, configured for the UP by the base station based on at least one of an uplink resource type, an uplink resource scheduling mode, and an uplink resource transmission mode, of a plurality of logical channels to which the uplink resources allocated in the UL grant are applicable. It should be particularly noted here that the logical channel herein may refer to a logical channel or a logical channel group. For example, a plurality of logical channels may be grouped into one logical channel group based on the same or similar quality level of service requirements, or logical channels having the same or similar priority level requirements may be grouped into one logical channel group, and then, a priority order of different logical channel groups may be reflected by priority levels logical channels included therein; on the contrary, priorities of logical channels included in a logical channel group having a high priority level are always higher than that of a logical channel group having a low priority level. Further, logical channels in one logical channel group may still have a priority order. Therefore, unless otherwise indicated, the term "logical channel" may be used interchangeably with the "logical channel group" herein.

In one exemplary embodiment in which the UE obtains a priority order, configured for the UE by the base station based on an uplink resource type, of a plurality of logical channels to which the uplink resources allocated in the UL grant are applicable, the priority order of the plurality of logical channels may be pre-configured by the base station through radio resource control (RRC) signaling. For example, the base station (or the network side) pre-configures a correspondence between an (uplink) resource type and logical channels through RRC signaling, where the resource type may be defined based on the size of a TTI or a numerology type or the size of a subcarrier spacing of the resources, or the resource type is directly determined according to the size of the TTI or the numerology type or the size of the subcarrier spacing. The base station may configure different resource types respectively corresponding to logical channels (or logical channel identities) to which the resources may be applicable or are preferentially applicable; based on the correspondence, when receiving a UL grant, the UE may obtain, according to the type of uplink resources allocated in the UL grant, a priority order of a plurality of logical channels applicable based on the uplink resource type, and then determine a logical channel having the highest priority level.

In another exemplary embodiment in which the UE obtains a priority order, configured for the UE by the base station based on an uplink resource type, of a plurality of logical channels to which the uplink resources allocated in the UL grant are applicable, the priority order of the plurality of logical channels may be dynamically instructed to the UE in DCI (downlink control information) carried in a PDCCH (physical downlink control channel), and meanwhile, the DCI further carries the uplink resources, namely, the UL grant, allocated to or scheduled for the UE by the base station. It may be considered that while obtaining the UL grant, the UE obtains dynamically instructed information related to the priority order of the plurality of logical channels. For example, indication information may be carried in the content carried in the PDCCH or the DCI scheduling the uplink resources so as to instruct a logical channel to which the currently scheduling uplink resources may be applicable or are preferentially applicable, and in the case in which a plurality of applicable logical channels exist, instruct a priority order of these logical channels. Since the uplink resources corresponding to the UL grant are allocated/scheduled in the DCI and meanwhile the DCI further instructs information related to priorities of a plurality of logical channels, it is considered that when receiving a UL grant, the UE may obtain a priority order of a plurality of logical channels applicable based on the type of uplink resources allocated in the UL grant, and then determine a logical channel having the highest priority level.

In one exemplary embodiment, the UL grant may be applicable only to an uplink resource grant in a specific uplink resource scheduling mode, for example, a UL grant of uplink resources for semi-persistentscheduling. Then, in an exemplary embodiment in which the UE obtains a priority order, configured for the UE by the base station based on a specific uplink resource scheduling mode, of a plurality of logical channels to which the uplink resources allocated in the UL grant are applicable, in the case in which the UE receives a PDCCH for semi-persistent scheduling scrambled by a network identifier (which may be regarded as obtaining a semi-persistent scheduling UL grant) and receives the content carried in the PDCCH or uplink resources scheduled by DCI (which may be regarded as uplink resources for semi-persistent scheduling), the priority order of the plurality of logical channels applicable based on the uplink resource type may be obtained according to pre-configured or dynamically instructed information like that described before, and then a logical channel having the highest priority level may be determined.

In one exemplary embodiment, the UL grant be used for a UL grant of uplink resources in a specific uplink resource transmission mode, for example, uplink resources in a grant free transmission mode. Then, in an exemplary embodiment in which the UE obtains a priority order, configured for the UP by the base station based on a specific uplink resource transmission mode, of a plurality of logical channels to which the uplink resources allocated in the UL grant are applicable, in the case in which the UE receives a PDCCH for the specific uplink resource transmission mode scrambled by a network identifier (which may be regarded as obtaining a UL grant of the specific transmission mode) and receives the content carried in the PDCCH or uplink resources scheduled by DCI (which may be regarded as uplink resources for the specific transmission mode), the priority order of the plurality of logical channels applicable based on the uplink resource type may be obtained according to pre-configured or dynamically instructed information like that described before, and then a logical channel having the highest priority level may be determined.

Next, the UE uses a logical channel priority process to assemble (assembly) a MAC PDU at a MAC layer. Specifically:

In step S103, the UE may judge whether a BSR carried in a MAC CE includes buffer status information of a logical channel having the highest priority level, or judge whether buffer status information of a logical channel having the highest priority level carried in the BSR is zero. Specifically, when the BSR reports, in the unit of a logical channel group, buffer information of each logical channel group, the aforementioned judgment process may further be that the UE determines a logical channel group to which a logical channel having the highest priority level belongs, and then judges whether the BSR carried in the MAC CE includes buffer status information of the aforementioned logical channel group, or judges whether buffer status information of the aforementioned logical channel group carried in the BSR is zero. Alternatively, the UE judges whether the BSR carried in the MAC CE includes buffer status information of a logical channel group to which a logical channel having the highest priority level belongs, or judges whether buffer status information, carried in the BSR, of a logical channel group to which a logical channel having the highest priority level belongs is zero.

If the BSR carried in the MAC CE does not include the buffer status information of the logical channel having the highest priority level or the buffer status information of the logical channel having the highest priority level carried in the BSR is zero, then the method 100 enters step S104 where the UE sets a priority level of the MAC CE carrying the BSR to be lower than/not higher than a priority level of data from the logical channel having the highest priority level; and optionally, further sets the priority level of the MAC CE carrying the BSR to be higher than/not lower than a priority level of data from the other logical channels other than data from an uplink common control channel.

In one exemplary embodiment, if a space of the allocated uplink resources remaining after the data of the logical channel having the highest priority level is assembled into the MAC PDU is insufficient to accommodate the MAC CE carrying the BSR, or the remaining space of the allocated uplink resources is insufficient to accommodate the MAC CE carrying the BSR and a MAC PDU header thereof, then the UE may generate a padding BSR according to the remaining space of the allocated uplink resources and use a MAC CE to carry the padding BSR to pad the remaining space of the allocated uplink resources, namely, to be assembled into the MAC PDU, where the MAC CE carrying the padding BSR includes at least buffer status information of a logical channel having the highest priority level among the other logical channels (namely, logical channels other than the logical channel having the highest priority level from which the data assembled into the MAC PDU comes). Specifically, the MAC CE of the padding BSR may include only the buffer status information of the logical channel having the highest priority level among the other logical channels, or may include buffer status information of a plurality of other logical channels ordered according to priorities. As described before, the priority order of these logical channels is pre-configured by the base station through RRC signaling or dynamically instructed to the UE in DCI carried in a PDCCH.

If the BSR carried in the MAC CE includes the buffer status information of the logical channel having the highest priority level, or the buffer status information of the logical channel having the highest priority carried in the BSR is not zero, or the BSR carried in the MAC CE includes the buffer status information of the logical channel group to which the logical channel having the highest priority level belongs, or the buffer status information, carried in the BSR, of the logical channel group to which the logical channel having the highest priority level belongs is not zero, then the method 100 enters step S105 where the UE sets a priority level of the MAC CE carrying the BSR to be higher than/not lower than a priority level of data from any logical channel other than data from an uplink common control channel.

In one exemplary embodiment, if a MAC CE carries information generated by the UE related to link interruption recovery (for example, control information related to beamforming), then a priority level of the MAC CE carrying the information related to link interruption recovery is set to be higher than the priority level of the data from any logical channel other than the data from the uplink common control channel.

In one exemplary embodiment, a MAC CE may further carry information related to a recommended bit rate. Accordingly, if a MAC CE carries information related to a recommended bit rate of a logical channel, then a priority level of the MAC CE carrying the information related to the recommended bit rate of the logical channel is set to be lower than/not higher than the priority level of the MAC CE carrying the BSR and the priority level of the data from any logical channel other than the data from the uplink common control channel.

Since one MAC CE carries a recommended bit rate of only one logical channel, when recommended bit rate queries of a plurality of logical channels all need to be reported to the base station, a plurality of MAC CEs respectively carrying information related to recommended bit rates of the logical channels are generated, and priorities of the plurality of MAC CEs are determined according to priorities of the logical channels carried therein. For example, after the UE obtains a UL grant and determines a logical channel having the highest priority level, a MAC CE carrying a recommended bit rate of the logical channel having the highest priority has the highest priority level among these MAC CEs, while priorities of the other MAC CEs may be further determined by determining priorities of the other logical channels. As described before, a priority order of these logical channels is pre-configured by the base station through RRC signaling or dynamically instructed to the UE in DCI carried in a PDCCH.

In step S105, the UE may, according to the set priority order of the data and the MAC CE, sequentially assemble the data and the MAC CE into a MAC protocol data unit (PDU) for transmission on the allocated uplink resources.

Figure 2:
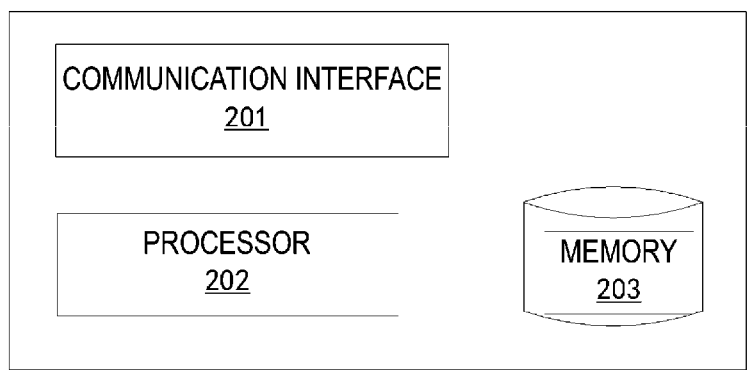
FIG. 2 is a schematic structural block diagram of UE according to an exemplary embodiment of the present disclosure.

The structure of UE according to an exemplary embodiment of the present invention will be described below with reference to FIG. 2. FIG. 2 is a schematic structural block diagram of UE according to an exemplary embodiment of the present invention. The UE 200 can be used for performing the method 100 described with reference to FIG. 1. For the sake of simplicity, only a schematic structure of the UE according to the exemplary embodiment of the present disclosure is described here, and details already described in the method 100 described above with reference to FIG. 1 are omitted.

As shown in FIG. 2, the UE 200 may include a communication interface 201 configured to perform external communication; a processing unit or a processor 202, where the processor 202 may be a single unit or a combination of a plurality of units configured to perform different steps of the method; and a memory 203 storing computer-executable instructions.

In an embodiment in which the UE 200 is used for performing the method 100, when executed by the processor 202, the instructions cause the UE 200 to perform the following process:

receiving a UL grant from a base station via the communication interface 201, where the UL grant includes information related to uplink resources allocated to the UE by the base station;

obtaining a priority order, configured for the UE by the base station based on at least one of an uplink resource type, an uplink resource scheduling mode, and an uplink resource transmission mode, of a plurality of logical channels to which the uplink resources allocated in the UL grant are applicable;

if a buffer status report (BSR) carried in a medium access control (MAC) control element (CE) does not include buffer status information of a logical channel having the highest priority level, then setting a priority level of the MAC CE carrying the BSR to be lower than a priority level of data from the logical channel having the highest priority level; and according to the set priority order of the data and the MAC CE, sequentially assembling the data and the MAC CE into a MAC protocol data unit (PDU) for transmission on the allocated uplink resources.

In one exemplary embodiment, the priority order of the plurality of logical channels is pre-configured by the base station through RRC signaling or dynamically instructed to the UE in DCI carried in a PDCCH.

In one exemplary embodiment, when executed by the processor 202, the instructions further cause the UE 200 to perform the following process: if the buffer status report (BSR) carried in the medium access control (MAC) control element (CE) does not include the buffer status information of the logical channel having the highest priority level, then further setting the priority of the MAC CE carrying the BSR to be higher than a priority level of data from the other logical channels other than data from an uplink common control channel.

In one exemplary embodiment, when executed by the processor 202, the instructions further cause the UE 200 to perform the following process: if the buffer status report (BSR) carried in the medium access control (MAC) control element (CE) includes the buffer status information of the logical channel having the highest priority level, then setting the priority level of the MAC CE carrying the BSR to be higher than a priority level of data from any logical channel other than data from an uplink common control channel.

In one exemplary embodiment, when executed by the processor 202, the instructions further cause the UE 200 to perform the following process: if a space of the allocated uplink resources remaining after the data of the logical channel having the highest priority level is assembled into the MAC PDU is insufficient to accommodate the MAC CE carrying the BSR, then generating a padding BSR according to the remaining space of the allocated uplink resources and causing the padding BSR to be carried in a MAC CE to be assembled into the MAC PDU, where the MAC CE carrying the padding BSR includes at least buffer status information of a logical channel having a highest priority among the other logical channels.

In one exemplary embodiment, when executed by the processor 202, the instructions further cause the UE 200 to perform the following process: if a MAC CE carries information related to link interruption recovery, then setting a priority of the MAC CE carrying the information related to link interruption recovery to be higher than the priority level of the data from any logical channel other than the data from the uplink common control channel.

In one exemplary embodiment, when executed by the processor 202, the instructions further cause the UE 200 to perform the following process: if a MAC CE carries information related to a recommended bit rate of a logical channel, then setting a priority level of the MAC CE carrying the information related to the recommended bit rate of the logical channel to be lower than the priority level of the MAC CE carrying the BSR and the priority level of the data from any logical channel other than the data from the uplink common control channel, where when recommended bit rate queries of a plurality of logical channels need to be reported to the base station, a plurality of MAC CEs respectively carrying information related to recommended bit rates of the logical channels are generated, and priority levels of the plurality of MAC CEs are determined according to priority levels of the logical channels carried therein.

A method performed at a base station for configuring a priority order of a plurality of logical channel for UE according to an exemplary embodiment of the present disclosure will be described below with reference to FIG. 3.

Figure 3:
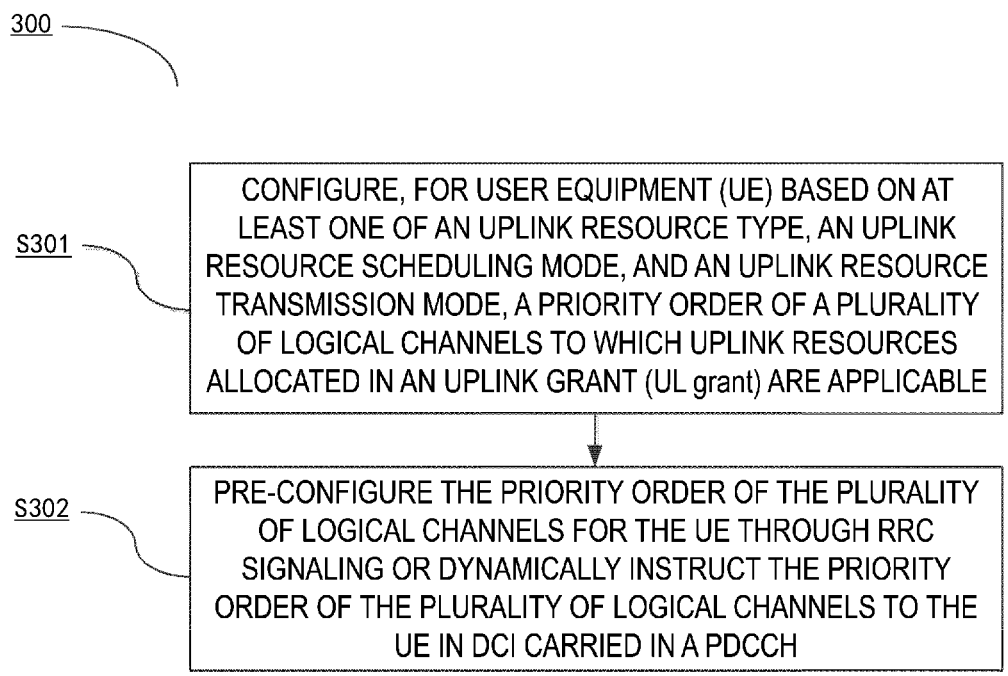
FIG. 3 is a schematic flowchart of a method performed at a base station for configuring a priority order of a plurality of logical channel for UE according to an exemplary embodiment of the present disclosure.

FIG. 3 is a flowchart of a method 300 performed at a base station for configuring a priority order of a plurality of logical channel for UE according to an exemplary embodiment of the present disclosure. As shown in FIG. 3, the method 300 may include steps S301 and S302.

In step S301, the base station may configure, for UE based on at least one of an uplink resource type, an uplink resource scheduling mode, and an uplink resource transmission mode, a priority order of a plurality of logical channels to which uplink resources allocated in a UL grant are applicable.

In step S302, the base station may pre-configure the priority order of the plurality of logical channels for the UE through RRC signaling or dynamically instruct the priority order of the plurality of logical channels to the UE in DCI carried in a PDCCH.

Figure 4:
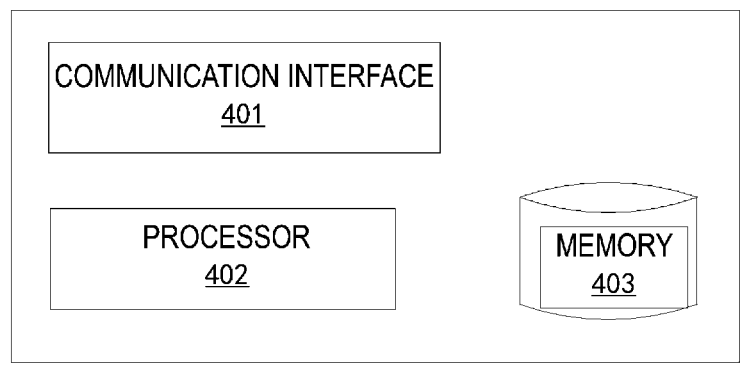
FIG. 4 is a schematic structural block diagram of a base station according to an exemplary embodiment of the present disclosure.

The structure of a base station according to an exemplary embodiment of the present invention will be described below with reference to FIG. 4, FIG. 4 is a schematic structural block diagram of a base station according to an exemplary embodiment of the present invention. The base station 400 can be used for performing the method 300 described with reference to FIG. 3. For the sake of simplicity, only a schematic structure of the base station according to the exemplary embodiment of the present disclosure is described here, and details already described in the method 300 described above with reference to FIG. 3 are omitted.

As shown in FIG. 4, the base station 400 may include a communication interface 401 configured to perform external communication; a processing unit or a processor 402, where the processor 402 may be a single unit or a combination of a plurality of units configured to perform different steps of the method; and a memory 403 storing computer-executable instructions.

In an embodiment in which the base station 400 is used for performing the method 300, when executed by the processor 302, the instructions cause the base station 400 to perform the following process:

configuring, for UE based on at least one of an uplink resource type, an uplink resource scheduling mode, and an uplink resource transmission mode, a priority order of a plurality of logical channels to which uplink resources allocated in a UL grant are applicable; and pre-configuring the priority order of the plurality of logical channels for the UE through RRC signaling via the communication interface, or dynamically instructing the priority order of the plurality of logical channels to the UE in DCI carried in a PDCCH.

The program running on the device according to the present disclosure may be a program that enables a computer to implement the functions of the embodiments of the present disclosure by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present disclosure may be recorded on a computer-readable recording medium. The corresponding functions may be achieved by reading programs recorded on recording medium and executing them by the computer system. The so-called "computer system" herein may be a computer system embedded in the device, which may include operating systems or hardware (for example, peripherals). The "computer-readable recording medium" may be a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present disclosure may also be implemented using these new integrated circuit technologies.

Furthermore, the present disclosure is not limited to the embodiments described above. Although various examples of the described embodiments have been described, the present disclosure is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present disclosure have been described in detail above with reference to the accompanying drawings. However, the specific structures are not limited to the above embodiments. The present disclosure also includes any design modifications that do not depart from the substance of the present disclosure. In addition, various modifications can be made to the present disclosure within the scope of the claims. Embodiments resulted from the appropriate combinations of the technical means disclosed in different embodiments are also included within the technical scope of the present disclosure. In addition, components with the same effect described in the above embodiments may be replaced with one another.

The invention claimed is:

1. A user equipment, comprising:
a processor; and
memory in electronic communication with the processor, wherein instructions stored in the memory are executable to:
receive a Downlink control Information (DCI) which includes an uplink resource assignment corresponding to an uplink grant (UL grant) and a priority information;
determine a logical channel applicable for the UL grant based on the priority information;
in a case there is a MAC CE carrying information related to beam, set a priority order between a data from the logical channel and the MAC CE, in the priority order, the priority of the MAC CE being higher than the priority of the data from the logical channel other than the data from an uplink common control channel; and
according to the priority order of the data from the logical channel and the MAC CE, assemble the data and the MAC CE into a MAC protocol data unit (PDU).

2. A method performed by UE comprising:
receiving a Downlink control Information (DCI) which includes an uplink resource assignment corresponding to an uplink grant (UL grant) and a priority information;
determining a logical channel applicable for the UL grant based on the priority information;
in a case there is a MAC CE carrying information related to beam, setting a priority order between a data from the logical channel and the MAC CE, in the priority order, the priority of the MAC CE being higher than the priority of the data from the logical channel other than the data from an uplink common control channel; and
according to the priority order of the data from the logical channel and the MAC CE, assembling the data and the MAC CE into a MAC protocol data unit (PDU).

* * * * *